(No Model.)
D. J. DALY.
FARE REGISTER FOR STREET CARS.
No. 506,845. Patented Oct. 17, 1893.
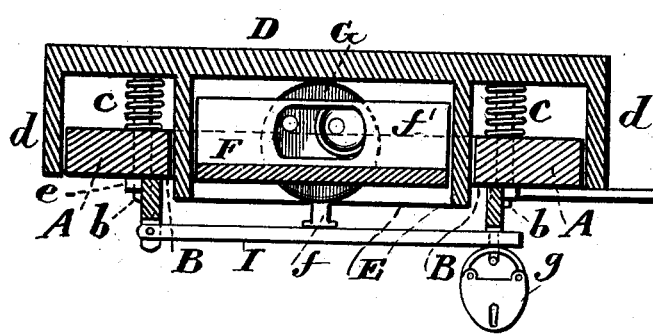
Fig. 1.
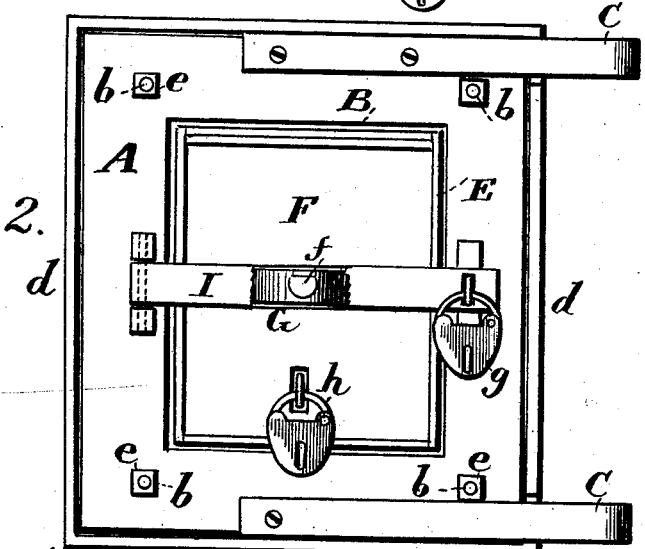
Fig. 2.
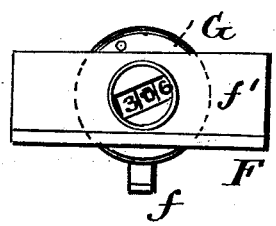
Fig. 4.
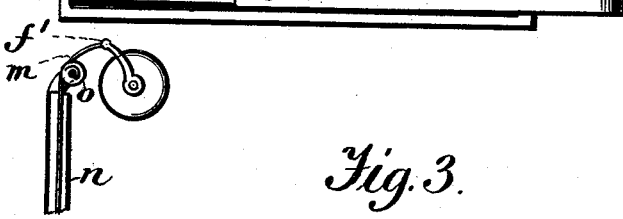
Fig. 3.
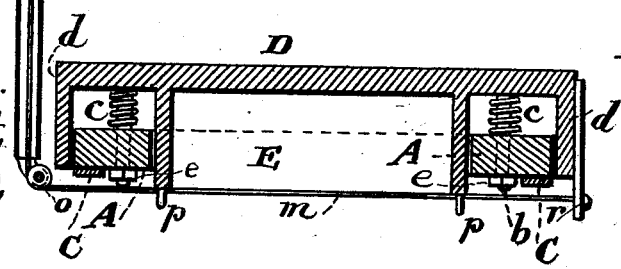
Witnesses.
A. Ruppert.
H. A. Daniels
Inventor.
Dennis J. Daly
per
Thomas P. Simpson
atty

UNITED STATES PATENT OFFICE.

DENNIS J. DALY, OF PHILADELPHIA, PENNSYLVANIA.

FARE-REGISTER FOR STREET-CARS.

SPECIFICATION forming part of Letters Patent No. 506,845, dated October 17, 1893.

Application filed March 10, 1893. Serial No. 465,418. (No model.)

*To all whom it may concern:*

Be it known that I, DENNIS J. DALY, a citizen of the United States of America, residing at Philadelphia, in the county of Philadelphia and State of Pennsylvania, have invented certain new and useful Improvements in Fare-Registers for Street-Cars and other Vehicles, of which the following is a specification, reference being had therein to the accompanying drawings.

This invention relates to fare registers for street cars and other passenger conveyances, and consists in certain improvements in the construction of such devices, as hereinafter described and claimed.

In the accompanying drawings—Figure 1 represents a vertical section of a step of a car and a register with my improvements applied thereto. Fig. 2 represents a bottom plan view of the same. Fig. 3 is a sectional view, showing a modification in construction.

A designates a plate having a central, rectangular opening B, said plate being fastened to iron strip C, for connection with a car or other vehicle, as steps are commonly secured in position.

D indicates a flanged plate which is placed on the plate A with the flanges $d$ extending down and about the edges of said plate A.

To the plate D is centrally secured a box E which opens downward and fits loosely in the opening B in the plate A. The threaded bolts $b$, forming guides, extend downward from the plate D, being made fast thereto, and extend through holes in the plate A, spiral springs $c$ being placed on said bolts between plates A and D, the former being recessed to receive the upper ends of said springs. Nuts $e$ are placed on the ends of the bolts $b$, so that the two said plates are connected by said bolts but are held apart by the springs $c$.

F indicates a plate which fits loosely in the box E and forms a lid to said box. To the plate F is secured a register G, in any suitable manner so that it may be taken from the box, with the plate F to be viewed. As shown in the drawings, the register is shown seated in a block which is made fast to the plate F. A push-bar or rod $f$ extends downward from the register which is actuated by the endwise movement of said rod as hereinafter stated.

I indicates a bar which extends under the plate F and crosswise of said plate, said bar being hinged at one end to the plate A or to a projection thereon, and the opposite end of said bar may be detachably connected with said plate A by lock and key as seen at $g$. The lid or plate F may also be secured to the box by a lock and key as seen at $h$. The bar I, when closed, is in position for contact with the push-rod $f$ of the register, when the plate D is pressed downward by any one stepping on it in getting aboard the car.

When a passenger, in getting aboard the car, steps on the plate D, the said plate, with the box E, is pressed downward, so that the push-rod $f$, coming in contact with the bar I, actuates the mechanism of the register. The person who has charge of the register may afterward unlock the hinged bar I and take out the plate F, to which the register is secured, and, by looking at the latter, ascertain the number of fares paid.

A modifiation in construction is shown in Fig. 3, in which the register is shown fixed in position at one end of the car, and an arm or rod $f'$ extends from the register and is adapted to actuate the latter when said rod is moved by means of a cord $m$ which is attached thereto. A tube $n$ is secured to the wall of the car and extends downward about as far as the level of the step, and the cord $m$ is passed down through the tube $n$ and over pulleys $o$, one of which is at the upper and the other at the lower end of said tube, and from thence through eyes $p$, connected with the plate D and box E, to the opposite edge of plate D, where the cord is attached as seen at $r$. By this construction, when a passenger steps on the plate D, the cord $m$ is drawn sufficiently to move the rod $f$, and operate the register.

I claim—

The plate A with the opening B and bar C to connect with vehicle, the plate D with the down flanges $d$, the box E fitting loosely in the opening B, the nutted guide-screws $b$ attached to and below the plate D, the spiral springs $c$ arranged on bolts $b$ between the plates A D, the plate F fitting loosely in box E, the register G with pushbar $f$ and the hinged lock-bar I on which the pushbar bears, all combined constructed and arranged substantially as shown and described.

In testimony whereof I have affixed my signature in presence of two witnesses.

DENNIS J. DALY.

Witnesses:
 PAUL A. WORTMAN,
 JESSE GILBERT.